United States Patent
Ward et al.

(10) Patent No.: US 7,066,700 B2
(45) Date of Patent: Jun. 27, 2006

(54) SELF-ATTACHING FASTENER AND METHOD OF ATTACHMENT

(75) Inventors: Richard P. Ward, Canton, MI (US);
Harold T. Woods, Flat Rock, MI (US);
John J. Vrana, Rochester Hills, MI (US); John M. Parker, Ann Arbor, MI (US); Kerry V. Boggs, South Lyon, MI (US)

(73) Assignee: Whitesell International Corporation, Taylor, MI (US)

( * ) Notice: Subject to any disclaimer, the term of this patent is extended or adjusted under 35 U.S.C. 154(b) by 24 days.

(21) Appl. No.: 10/758,906

(22) Filed: Jan. 16, 2004

(65) Prior Publication Data

US 2004/0146376 A1 Jul. 29, 2004

Related U.S. Application Data

(63) Continuation-in-part of application No. 10/612,455, filed on Jul. 2, 2003, which is a continuation-in-part of application No. 10/439,526, filed on May 16, 2003, which is a continuation-in-part of application No. 10/232,335, filed on Aug. 30, 2002, now Pat. No. 6,851,904.

(51) Int. Cl.
*F16B 37/04* (2006.01)
(52) U.S. Cl. ........................... 411/180; 411/188
(58) Field of Classification Search ............... 411/180, 411/181, 187, 188
See application file for complete search history.

(56) References Cited

U.S. PATENT DOCUMENTS

| 2,037,586 | A | * | 4/1936 | Olson | 411/188 |
|---|---|---|---|---|---|
| 2,128,757 | A | * | 8/1938 | Olson | 411/187 |
| 3,358,727 | A | * | 12/1967 | Hughes | 411/180 |
| 4,543,023 | A | * | 9/1985 | Capuano | 411/180 |
| 4,831,698 | A | | 5/1989 | Muller | 29/512 |
| 5,207,588 | A | * | 5/1993 | Ladouceur et al. | 439/84 |
| 5,340,251 | A | * | 8/1994 | Takahashi et al. | 411/179 |
| 5,531,552 | A | | 7/1996 | Takahashi et al. | 411/179 |
| 5,882,159 | A | * | 3/1999 | Muller | 411/179 |
| 6,004,087 | A | | 12/1999 | Muller | 411/180 |
| 6,220,804 | B1 | | 4/2001 | Pamer et al. | |
| 6,318,940 | B1 | * | 11/2001 | Mitts | 411/188 |
| 2004/0042872 | A1 | * | 3/2004 | Ward et al. | 411/181 |

FOREIGN PATENT DOCUMENTS

EP 0864766 A1 9/1998

* cited by examiner

*Primary Examiner*—Flemming Saether
(74) *Attorney, Agent, or Firm*—Howard & Howard (57) ABSTRACT

A self-attaching fastener including a central pilot, an annular flange surrounding the pilot including an annular groove having bottom, inner and outer side walls, wherein the bottom wall includes a first plurality of spaced anti-rotation elements each having a radial top face inclined above the bottom wall and a second plurality of circumferentially spaced anti-rotation elements each having a radial top face oppositely inclined below the bottom wall and a method of attachment which avoids distortion of the thread cylinder of a female fastener.

20 Claims, 3 Drawing Sheets

SELF-ATTACHING FASTENER AND METHOD OF ATTACHMENT

RELATED APPLICATIONS

This application is a continuation-in-part application of Ser. No. 10/612,455 filed Jul. 2, 2003, which application is a continuation-in-part application of Ser. No. 10/439,526, filed May 16, 2003, which is a continuation-in-part of application Ser. No. 10/232,335, filed Aug. 30, 2002 now U.S. Pat. No 6,851,904.

FIELD OF THE INVENTION

This invention relates to self-attaching fasteners, particularly including pierce and clinch nuts and studs, which may be formed by conventional cold header techniques, including secondary operations, and which provide improved retention and resistance to rotation of the fastener on a panel following installation.

BACKGROUND OF THE INVENTION

Self-attaching female fasteners, including pierce and clinch nuts, formed by colder header techniques and secondary press operations, generally include a central pilot portion having an end face including a bore therethrough, an annular flange portion surrounding the pilot portion having a planar panel-supporting end face and an annular groove in the end face of the flange portion surrounding the pilot portion including a bottom wall, an inner side wall surrounding the pilot portion and an opposed outer side wall. Generally, at least one of the inner and outer side walls of the annular groove is inclined toward the other side wall to provide a restricted opening to the annular groove adjacent the end face of the flange portion to improve retention of the fastener following installation in a panel. Further improved retention of the fastener on a panel may be provided by inclining both the inner and outer side walls of the annular groove toward the opposed side wall forming a "dovetail" shaped re-entrant groove. When the panel is deformed against the bottom wall of the groove by a die member or die button having a projecting annular lip configured to be received in the annular groove, the panel is simultaneously deformed beneath the inclined side wall or walls of the annular groove to provide improved retention of the fastener element on the panel. Alternatively, the outer side wall of the annular groove may be inclined toward the pilot portion and the pilot portion may be deformed radially outwardly during installation to provide improved retention as disclosed, for example, in U.S. Pat. No. 6,276,040. However, most installations of self-attaching fasteners also require sufficient torque resistance or anti-rotation means to prevent rotation of the self-attaching fastener on a panel following installation, particularly where the fastener and panel assembly is attached to a second component by a bolt or other male threaded member using a torque wrench or the like.

The prior art discloses various anti-rotation or torque resistant means for self-attaching female fasteners of the type disclosed herein. For example, U.S. Pat. No. 5,531,552 assigned to the predecessor in interest of the assignee of this application discloses forming a plurality of circumferentially spaced protrusions having radial channels therebetween in the bottom wall of the groove which provide improved torque resistance. U.S. Pat. No. 5,549,430 also assigned to the predecessor in interest of the assignee of this application discloses a self-attaching nut of this type, wherein the bottom wall of the groove includes a plurality of circumferentially spaced arcuate or semi-circular protrusions integral with the pilot portion which provide improved torque resistance, but which also deforms panel metal beneath the inclined outer side wall of the annular groove, providing improved push-off strength for the nut and panel installation. U.S. Pat. No. 5,782,594 discloses a pierce nut having a central recess, rather than a groove, having an inner side wall and a plurality of circumferentially spaced radial notches or pockets formed in the panel support face which, when formed by a die member, forms radially inwardly projecting bead like projections in the side wall of the recess, providing improved torque resistance. The above-referenced U.S. Pat. No. 6,276,040 also discloses opposed V-shaped webs integral with the bottom wall of a dovetail-shaped annular groove and the opposed inner and outer side walls of the annular groove. Further, the prior art includes pierce nuts of this type having rectangular ribs or lugs which bridge the bottom wall of the annular groove and are integral with both the inner and outer side walls of the groove as disclosed, for example, in U.S. Pat. No. 6,220,804. However, the pierce nut disclosed in this patent does not have sufficient push-off strength of the pierce nut installed in a panel for many applications and deformation of a panel against ribs integral with the pilot portion causes deformation or distortion of the thread cylinder of a pierce or clinch nut.

As will be understood from the above description of the prior art, there remains a need for a self-attaching fastener particularly but not exclusively including pierce and clinch nuts having improved fastener and panel installation integrity, including push or pull-off strength and torque resistance which avoids distortion of the thread cylinder during installation. The self-attaching fastener and method of assembly of this invention provides improved fastener and panel integrity including improved torque resistance and which avoids distortion of the thread cylinder where the self-attaching fastener is a female fastener, such as a pierce or clinch nut.

SUMMARY OF THE INVENTION

The self-attaching fastener of this invention includes a central pilot portion, an annular flange portion surrounding the pilot portion having a planar end face and an annular groove in the planar end face of the flange portion surrounding the pilot portion, including a bottom wall, an inner side wall surrounding the pilot portion and an opposed outer side wall as described above. In a preferred embodiment of the self-attaching fastener of this invention, at least one of the inner and outer side walls of the annular groove is inclined toward the other side wall to define a restricted opening of the annular groove adjacent the planar end face of the flange portion. In the disclosed embodiments of the self-attaching female fastener of this invention, the central pilot portion includes a planar end face and a bore through the end face extending through the pilot portion which may be threaded to receive a male threaded fastener, such as a bolt, or the bore may be unthreaded to receive a thread forming or thread rolling male fastener. However, the self-attaching fastener of this invention may also be a male fastener, wherein the central pilot portion includes a male threaded or unthreaded shank portion. Thus, the self-attaching fastener of this invention may be a female or male fastener.

The bottom wall of the annular groove of the self-attaching fastener of this invention includes a plurality of circumferentially spaced radial anti-rotation elements including a first plurality of circumferentially spaced radial anti-rotation elements each having a top face spaced above a plane of the bottom wall of the annular groove and a second plurality of circumferentially spaced radial anti-rotation elements each having a top face spaced below the plane of the bottom wall of the annular groove. In the disclosed embodiment of the self-attaching fastener of this invention, the first and second plurality of anti-rotation elements circumferentially alternate, such that the first anti-rotation elements are located between the second anti-rotation elements. In a preferred embodiment of the self-attaching fastener of this invention, the top face of each of the circumferentially spaced anti-rotation elements are inclined relative to the bottom wall of the annular groove and extend from a midportion of the bottom wall, to one of the inner or outer sidewalls such that an upper end surface of the first plurality of circumferentially spaced radial anti-rotation elements is spaced above a plane of the bottom wall and a lower end surface of each of the second plurality of circumferentially spaced anti-rotation elements is spaced below the plane of the bottom wall.

In one preferred embodiment of the of the self-attaching fastener of this invention, the inner side wall of the annular groove is inclined toward the outer side wall and the top face of each of the second plurality of circumferentially spaced anti-rotation elements is inclined downwardly toward the inner side wall of the annular groove below the plane of the bottom wall and the top face of the first plurality of circumferentially spaced anti-rotation elements is inclined upwardly to the outer side wall of the annular groove having an end surface integral with the outer side wall of the annular groove and spaced above the bottom wall. Where the self-attaching fastener of this invention is a female fastener having a thread bore, as described above, this configuration of the self-attaching fastener of this invention avoids distortion of the thread cylinder during installation of the female fastener element in a panel by a die member as described below. Further, the utilization of alternating first and second anti-rotation elements, as described above, results in a significant improvement in torque resistance when the fastener is installed in a panel without thread distortion.

A further improvement in pull-out strength of the fastener and panel assembly is also provided by the self-attaching fastener of this invention, wherein the outer side wall of the annular groove is inclined toward the inner side wall and the first plurality of circumferentially spaced anti-rotation elements are integral with the outer side wall and are inclined upwardly from a midportion of the bottom wall to the outer side wall. In one preferred embodiment of this invention, the second plurality of circumferentially spaced anti-rotation elements has a radial length greater than a radial length of the first plurality of circumferentially spaced anti-rotation elements. In the disclosed embodiment of the self-attaching fastener of this invention, the top face of the first plurality of circumferentially spaced anti-rotation elements extends from approximately the center of the bottom wall to the outer side wall of the annular groove and the top face of the second plurality of circumferentially spaced anti-rotation elements extends from a midportion of the bottom wall of the annular groove approximately two-thirds the radial width of the bottom wall. Again, this configuration has been found to have significantly improved torque resistance and avoids distortion of the thread bore during installation of the self-attaching fastener in a panel. As used herein, the term "thread cylindrical bore" includes a female threaded bore or a smooth adapted to receive a thread forming or thread rolling male threaded element.

The method of installing a self-attaching fastener of this invention includes driving the pilot portion of the self-attaching fastener through an opening in a metal panel. Where the self-attaching fastener is a self-piercing nut or stud, the end face of the pilot portion is first driven against a panel supported on a die member, piercing a slug from the panel and forming an opening in the panel which receives the pilot portion therethrough. Alternatively, the opening may be preformed in the panel. The panel surrounding the panel opening is then driven into the annular groove against the bottom wall of the annular groove and the top face of the circumferentially spaced anti-rotation elements. Finally, the panel is deformed around the top face of the first plurality of circumferentially spaced anti-rotation elements against the bottom wall and into the channels formed by the second plurality of circumferentially spaced anti-rotation elements. Where the top face of the second plurality of anti-rotation elements is inclined downwardly from the bottom wall toward the pilot portion and the inner side wall of the annular groove is inclined outwardly, as described above, the panel is simultaneously deformed beneath the inclined inner side wall of the annular groove improving torque resistance and providing improved push-off strength and avoiding distortion of the thread bore where the self attaching fastener is a female fastener. Where the outer side wall of the annular groove is inclined radially inwardly, the panel is simultaneously deformed beneath the outer side wall. Alternatively, as described above, the outer or inner side wall of the annular groove may be deformed radially inwardly or outwardly during installation of the self-attaching fastener in a panel.

As described above, the method of installing the self-attaching fastener of this invention provides improved push and pull-out strength and torque resistance without deformation or distortion of the thread cylinder through the pilot portion. Other advantages and meritorious features of this invention will be more fully understood from the following description of the preferred embodiments, the appended claims and the drawings, a brief description of which follows.

DESCRIPTION OF THE PREFERRED EMBODIMENTS

As will be understood, the disclosed embodiment of the self-attaching fastener 20 of this invention is for illustrative purposes only and various modifications may be made to the disclosed embodiment within the purview of the appended claims as discussed further below. As set forth above, the self-attaching fastener of this invention has improved torque resistance, push or pull-off strength in a fastener and panel assembly, but has the additional advantage of avoiding distortion of the thread cylinder of a female fastener. Thus, the self-attaching female fastener 20 is disclosed to illustrate one preferred embodiment of the self-attaching fastener of this invention. However, as described further below, the disclosed improvements of the self-attaching fastener of this invention may also be incorporated in a male fastener element having a threaded or unthreaded shank portion.

The illustrated embodiment of the self-attaching fastener 20 of this invention includes a central pilot portion 22 having an end face 24, a radial annular flange portion 26 surrounding the pilot portion 22 having an end face 28 and an annular groove 30 in the end face 28 of the annular flange portion 26. The annular groove 30 includes a bottom wall 32, an inner side wall 34 surrounding the pilot portion 22 and an opposed outer side wall 36. The illustrated embodiment of the self-attaching fastener 20 further includes a barrel portion 38 and a bore 40 extending through the end face 24 of the pilot portion 22 and the end face 42 of the barrel portion 38. The bore 40 may be threaded, as shown, to receive a male threaded fastener such as a bolt, or unthreaded to receive a thread forming or thread rolling male fastener. Alternatively, where the self-attaching fastener of this invention is a male fastener, the bore 40 may be eliminated and the barrel 38 has an appropriate diameter for the application and may be externally threaded. Where the self-attaching fastener 20 is utilized as a self-piercing fastener, the end face 24 of the pilot portion 22 is preferably planar and the pilot portion includes a cylindrical outer surface 44 forming a relatively sharp circular edge at the junction of the cylindrical surface 44 and the end face 24 as shown. The annular end face 28 of the flange portion 26 is also preferably planar and supports the panel in the fastener and panel assembly described below and parallel to the annular end face 24 of the pilot portion 22. In the disclosed embodiment, the annular end face 28 of the flange portion 26 is spaced below the plane of the annular end face 24 of the pilot portion 22. Alternatively, the end face 28 of the flange portion 26 may be aligned with the end face 24 of the pilot portion 22.

Figures 3, 4:
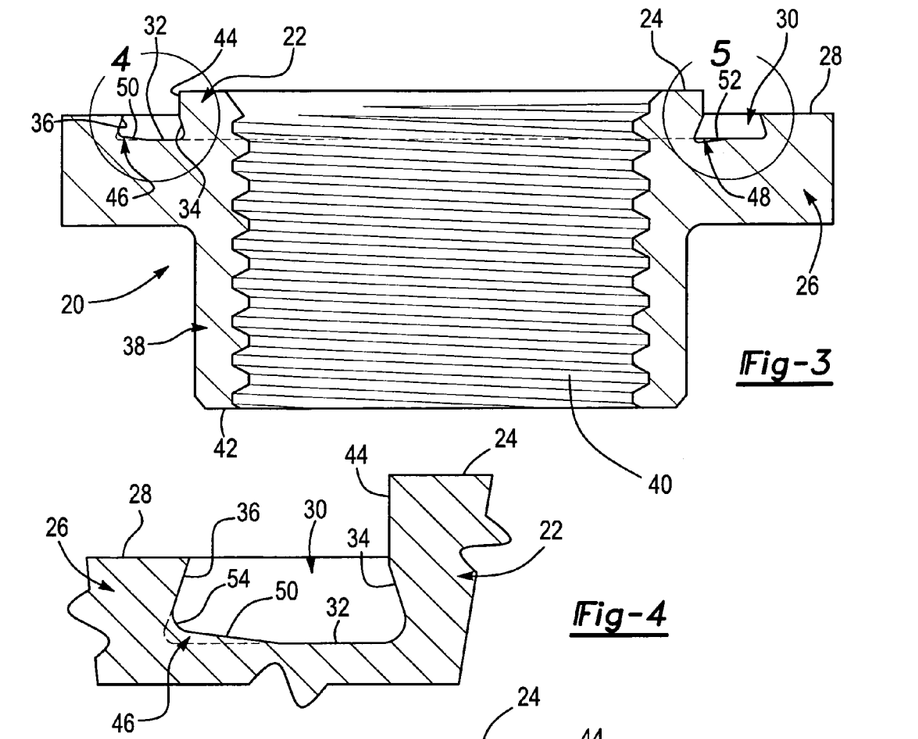
FIG. 3 is a cross-sectional view of FIG. 2 in the direction of view arrows 3—3.
FIG. 4 is a partial enlarged view of the encircled area 4 of FIG. 3.

In one preferred embodiment of the self-attaching fastener 20 of this invention, the inner side wall 34 of the annular groove 30 is inclined radially outwardly toward the flange portion 26 and in the disclosed embodiment, the opposed outer side wall 36 of the annular groove 30 is inclined radially inwardly from the bottom wall 32 toward the pilot portion 22 forming a "re-entrant groove," wherein the opening to the annular groove 30 adjacent the end face 28 of the flange portion 26 is smaller than the radial width of the annular groove 30 at the bottom wall 32 as best shown in FIG. 3. As will be understood by those skilled in this art, the utilization of a re-entrant groove results in a significant improvement in the push-off integrity of the fastener and panel assembly, particularly in combination with the anti-rotation elements of this invention described below. Alternatively, the flange portion 26 may be deformed radially inwardly or the pilot portion 22 may be deformed radially outwardly during installation of the self-attaching fastener forming a re-entrant groove as described above. Alternatively, only one of the inner and outer side walls 34 and 36, respectively, may be inclined toward the opposed side wall.

Figures 5, 6:
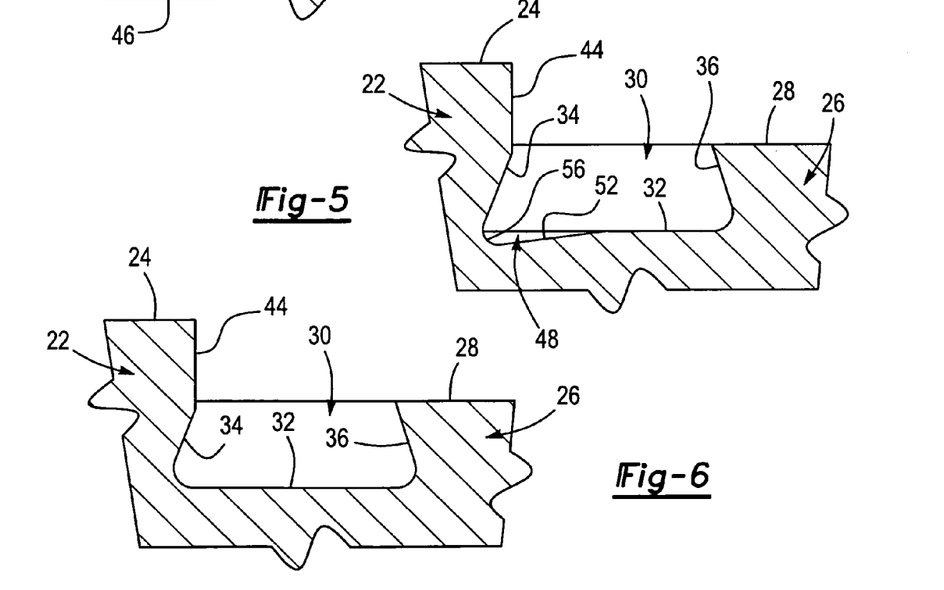
FIG. 5 is a an enlarged cross-sectional view of the encircled area 5 of FIG. 3.
FIG. 6 is a partial side cross-sectional view of FIG. 2 in the direction of view arrows 6—6.

In the preferred embodiment of the self-attaching fastener 20 of this invention, the bottom wall 32 of the annular groove 30 includes a plurality of circumferentially spaced radial anti-rotation elements which, as described below, further provide improved pull-off strength without distortion of the thread bore 40. As best shown in FIG. 6, the bottom wall 32 between the anti-rotation elements described below is planar in the disclosed embodiment and parallel to the planar annular end face 28 of the flange portion 26. The anti-rotation elements include a first plurality of circumferentially spaced anti-rotation elements 46 and a second plurality of circumferentially spaced anti-rotation elements 48. Each of the anti-rotation elements 46 and 48 include a planar radial top face 50 and 52, respectively. The top faces 50 of the first plurality of circumferentially spaced anti-rotation elements 46 is spaced above the plane of the bottom wall 32 of the annular groove 30 as shown in FIG. 4 and the top faces 52 of the second plurality of circumferentially spaced anti-rotation elements 48 is spaced below the plane of the bottom wall 32 of the annular groove 30 as shown in FIG. 5.

Figure 2:
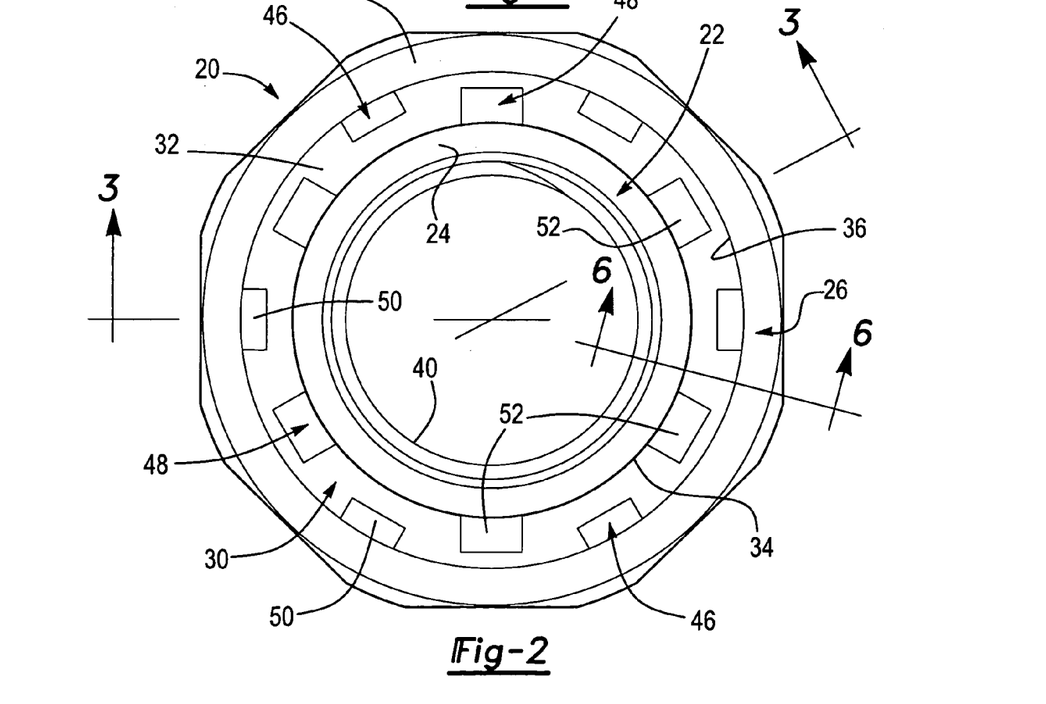
FIG. 2 is a top view of the self-attaching fastener shown in FIG. 1.

In a preferred embodiment of the self-attaching fastener 20 of this invention, the top face 50 of each of the first plurality of circumferentially spaced anti-rotation elements 46 is inclined radially upwardly from a midportion of the bottom wall 32 of the annular groove 30 as shown in FIG. 4 having an arcuate end surface 54 spaced above the plane of the bottom wall 32. Similarly, the top faces 52 of the second plurality of circumferentially spaced anti-rotation elements 48 are inclined downwardly from a midportion of the bottom wall 32 of the annular groove 30 each having an arcuate end surface 56 spaced below the plane of the bottom wall 32 of the annular groove. As used herein, the term "midportion" means spaced between the opposed inner and outer side walls 34 and 36, respectively, of the annular groove 30. However, as best shown in FIG. 2, the radial length of the top faces 52 of the second plurality of circumferentially spaced anti-rotation elements 48 preferably has a radial length greater than the radial length of the top faces 50 of the first plurality of circumferentially spaced anti-rotation elements 46. In the disclosed embodiment of the self-attaching fastener 20 of this invention, the radial length of the top faces 50 of the first plurality of circumferentially spaced anti-rotation elements 46 extend approximately one-half of the radial width of the bottom wall 32 and the radial width of the top faces 52 of the second plurality of circumferentially spaced anti-rotation elements 48 extend approximately two-thirds the radial width of the bottom wall 32. Further, the top faces 50 and 52 of the first and second plurality of circumferentially spaced anti-rotation elements 46 and 48, respectively, are preferably inclined relative to the bottom wall 32 of the annular groove 30 at a relatively slight angle, preferably between five and fifteen degrees. In the disclosed embodiment of the self-attaching fastener 20 of this invention, the top faces 50 and 52 are inclined relative to the bottom wall 32 at an angle of about ten degrees. Further, in a preferred embodiment, the top faces 50 and 52 are rectangular as best shown in FIG. 2.

Figure 1:
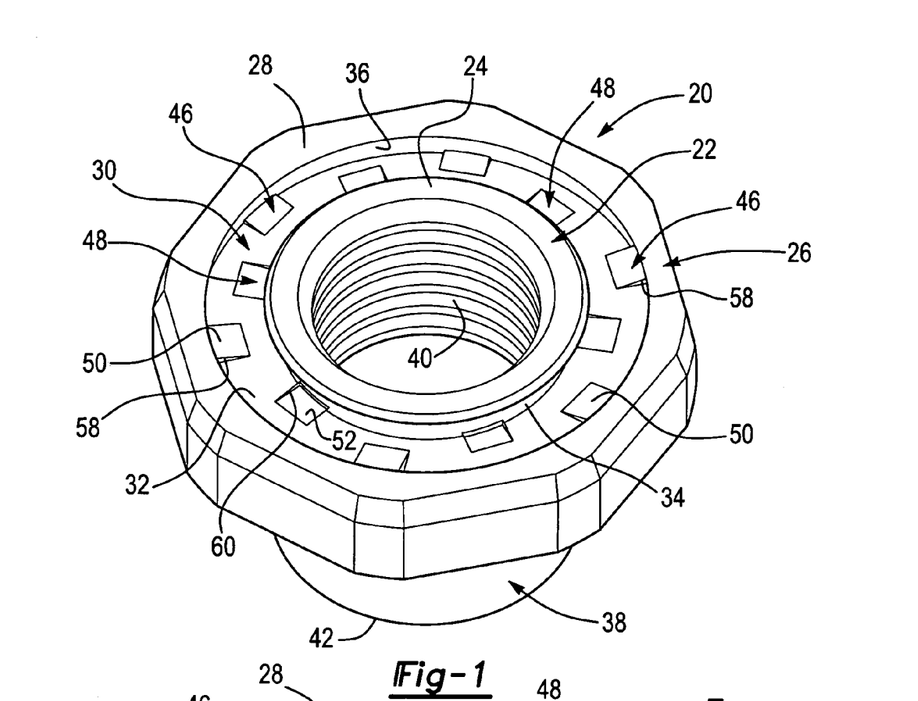
FIG. 1 is a top perspective view of one embodiment of a self-attaching fastener of this invention.

As set forth above, the self-attaching fastener 20 of this invention results in improved torque resistance and pull-off strength while avoiding distortion of the thread cylinder or bore 40 when utilized as a female fastener as shown in the Figures. Where the self-attaching fastener is a female fastener, the arcuate end surfaces 54 of the top faces 50 of the first plurality of circumferentially spaced anti-rotation elements 46 are preferably integral with the outer side wall 36 providing improved torque resistance and strengthening the inclined outer side wall 36 as shown in FIG. 4. As shown in FIG. 1, the first plurality of circumferentially spaced anti-rotation elements 46 include triangular side faces 58 which extend perpendicular to the bottom wall 32 which inhibit rotation of the fastener element 20 when installed in a panel.

Similarly, the downwardly inclined top faces 52 of the second plurality of circumferentially spaced anti-rotation elements 48 define radial channels having triangular side faces 60 as shown in FIG. 1 which also preferably extend generally perpendicular to the bottom wall 32. As will be understood, the terms "upwardly" and "downwardly" are relative terms. As used herein, the term "upwardly" refers to a direction from the bottom wall 32 toward the end faces 24 and 28 of the pilot portion 22 and the flange portion 26, respectively. The term "downwardly" refers to the opposite direction. As the panel metal is driven against the bottom wall 32, the panel is simultaneously driven into the channel-shaped recesses defined by the downwardly inclined top faces 52 of the second plurality of circumferentially spaced anti-rotation elements 48 providing further improved torque resistance.

Although the improvement in the torque resistance provided by the self-attaching fastener 20 of this invention is not fully understood, testing indicates that the utilization of ribs projecting upwardly from the bottom wall 32 and integral with the inner side wall 34 of the annular groove 30 results in deformation of the thread cylinder 40. No deformation of the thread cylinder was found where channel-shaped recesses are provide having a top face 52 inclined downwardly from a midportion of the bottom wall 32. Further, the self-attaching fastener of this invention results in a 25% improvement in torque resistance as compared to a fastener of this general type having ribs or lugs projecting from the bottom wall, bridging the bottom wall and integral with the inner and outer side walls 34 and 36 as disclosed, for example, the above-referenced U.S. Pat. No. 6,220,804. It is believed that the use of a relatively shallow angle of inclination of the top faces 50 and 52 and the large area of the bottom wall 32 which extends parallel to the end face 28 of the annular flange portion 26 results in better material flow of the panel metal around the upwardly inclined first plurality of circumferentially spaced anti-rotation elements 46 integral with the outer groove wall 36 and the channel-shaped second plurality of circumferentially spaced anti-rotation elements 48. Further, the elimination of ribs integral with or adjacent to the inner side wall 34 eliminates distortion of the thread cylinder 40.

Figure 7:
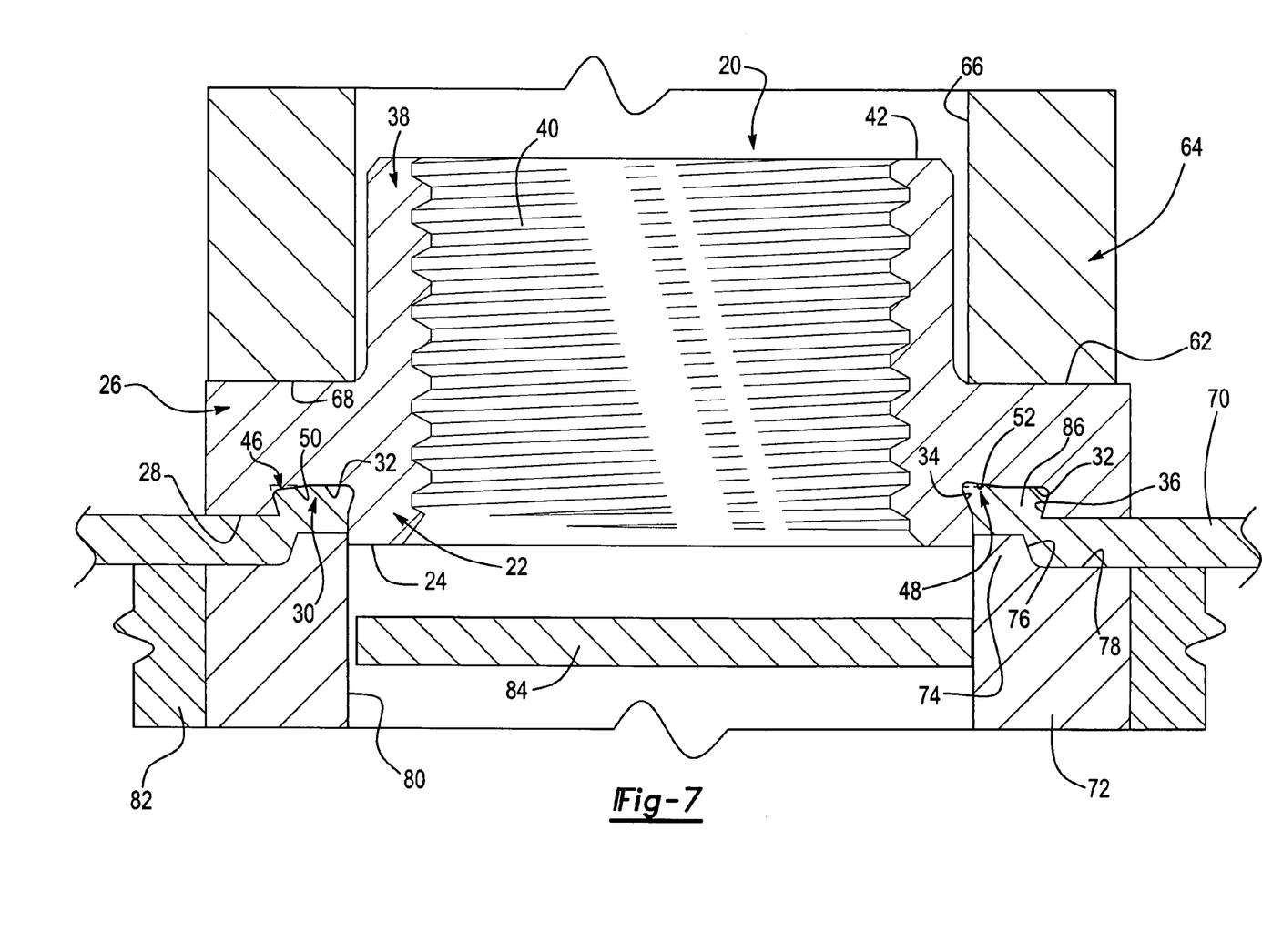
FIG. 7 is a side cross-sectional view of a fastener and panel assembly illustrating a method of attaching the fastener illustrated in the prior Figures in a metal panel.

Finally, FIG. 7 illustrates one preferred method of installing the self-attaching fastener 20 in a panel 70. As will be understood by those skilled in this art, self-attaching fasteners are typically installed in a die press (not shown) including an installation head having a reciprocating plunger 64. In this embodiment, the plunger 64 includes an axial opening 66 which receives the barrel portion 38 of the fastener 20 and an annular end face 68 which is driven against the annular back face 62 of the flange portion 26. The panel 70 is supported on a die member or die button 72 having a projecting annular lip 74 including a frustoconical outer surface 76 and a planar back face 78 surrounding the annular lip 74. The die button 72 further includes a cylindrical opening 80 and the die button 72 is typically supported in a mounting block 82 in the lower die shoe of a die press (not shown). Where the self-attaching fastener 20 is utilized as a self-piercing fastener, such as a pierce nut or pierce stud, the planar end face 24 of the pilot portion 22 initially pierces a panel slug 84 from the panel in cooperation with the sharp edge defined between the cylindrical internal surface 80 and the end face of the annular lip 74 and the pilot portion 22 is then received through the pierced panel opening as shown in FIG. 7. Alternatively, the self-attaching fastener 20 may be utilized as a clinch fastener, wherein the opening through the panel is formed prior to installation.

As the self-attaching fastener 20 is driven by the plunger 64 against the panel 70 and the annular lip 74 is simultaneously driven against the panel portion 86 surrounding the pierced panel opening, the panel portion 86 is driven into the re-entrant annular groove 30 against the upwardly inclined top faces 50 of the first plurality of circumferentially spaced anti-rotation elements 46 as shown on the left-hand portion of FIG. 7 and against the downwardly inclined top faces 52 of the second plurality of circumferentially spaced anti-rotation elements. The cross-section of the self-attaching fastener 20 shown in FIG. 7 is identical to the cross-section of FIG. 3 as shown by view arrows 3—3 in FIG. 2, but rotated 180 degrees. Finally, the panel portion 86 is deformed around the upwardly inclined radial top faces 50 against the bottom wall 32 and beneath the inclined inner side wall 34 in the channel shaped recesses formed by the second plurality of circumferentially spaced anti-rotation elements 48.

The method of installing the self-piercing fastener 20 of this invention thus includes coaxially aligning the pilot portion 22 with the cylindrical opening 80 of the die button 72, driving the pilot portion 22 against the panel to pierce a slug 84 from the panel, driving the pilot portion 22 through an opening in the panel and driving the panel portion 86 surrounding the panel opening against the bottom wall 32 of the annular groove 30, the projecting upwardly inclined top faces 50 of the first plurality of circumferentially spaced anti-rotation elements 46 and against the downwardly inclined top faces 52 into the channel-shaped second plurality of circumferentially spaced anti-rotation elements 48, such that the panel portion 86 substantially fills the annular re-entrant groove 30 engaging the opposed relatively inclined side walls 34 and 36. As will be understood, however, it is preferable that the panel portion 86 does not completely fill the re-entrant groove 30 to avoid thread distortion.

As set forth above, various modifications may be made to the self-attaching fastener of this invention within the purview of the appended claims. In the disclosed embodiment of the self-attaching fastener 20 illustrated in the Figures, the first and second plurality of circumferentially spaced anti-rotation elements 46 and 48 circumferentially alternate, such that an anti-rotation element of the first plurality of circumferentially spaced anti-rotation elements 46 is circumferentially spaced between two anti-rotation elements of the second plurality of spaced anti-rotation elements 48 as shown in FIGS. 1 and 2. Although this staggered relationship is preferred for most applications, alternative arrangements may be utilized. Further, although the top faces 50 of the first plurality of circumferentially spaced anti-rotation elements 46 are preferably inclined from a midportion of the bottom wall 32 of the annular groove 30, the top faces 50 of the first plurality of circumferentially spaced anti-rotation elements 46 may also be parallel to the bottom wall or the bottom wall may be inclined. Although a re-entrant annular groove 30 is preferred for most applications, the outer wall 36 may be perpendicular to the bottom wall 32 or the outer wall 36 may be deformed radially inwardly during the installation of the self-attaching fastener in a panel as described above. Finally, although the self-attaching fastener 20 has particular advantages as a female fastener including a threaded or unthreaded bore, the self-attaching fastener of this invention may also be a self-attaching male fastener as described above. Having described the preferred embodiments of the self-attaching fastener and method of installation of this invention, the invention is now as claimed, as follows.

The invention claimed is:

1. A self-attaching fastener, comprising:
a central pilot portion;
an annular flange portion surrounding said pilot portion having a planar end face; and
an annular groove in said end face of said flange portion surrounding said pilot portion including a bottom wall, an inner side wall surrounding said pilot portion and an opposed outer side wall, one of said inner and outer side walls of said annular groove inclined toward the other of said inner and outer side walls to define a restricted opening of said annular groove adjacent said end face of said flange portion;
said bottom wall of said annular groove including a first plurality of circumferentially spaced radial ant-rotation elements each having a planar radially extending top face spaced above a plane of said bottom wall of said annular groove and a second plurality of circumferentially spaced radial anti-rotation elements each having a planar radially extending top face spaced below said plane of said bottom wall of said annular groove, each of said anti-rotation elements extending from one of said inner side wall and said outer side wall to a location spaced from the other of said inner side wall and said outer side wall.

2. The self-attaching fastener as defined in claim 1, wherein said first and second plurality of circumferentially spaced anti-rotation elements circumferentially alternate.

3. The self-attaching fastener as defined in claim 1, wherein said top faces of said first and second plurality of circumferentially spaced radial anti-rotation elements arc inclined relative to said bottom wall of said annular groove.

4. The self-attaching fastener as defined in claim 3, wherein said top face of each of said second plurality of circumferentially spaced radial anti-rotation elements is inclined downwardly from a midportion of said bottom wall of said annular groove to adjacent said one of said inner and outer side walls of said annular groove having an end surface spaced below said plane of said bottom wall of said annular groove adjacent said one of said inner and outer side walls.

5. The self-attaching fastener as defined in claim 3, wherein said planar top face of said first plurality of circumferentially spaced radial anti-rotation elements is inclined upwardly from a midportion of said bottom wall of said annular groove to one of said inner and outer side walls of said annular groove each having an end surface spaced above said plane of said bottom wall of said annular groove.

6. The self-attaching fastener as defined in claim 3, wherein said bottom wall of said annular groove is planar and extends generally parallel to said planar end face of said annular flange portion.

7. The self-attaching fastener as defined in claim 3, wherein said planer top face of each of said first and second plurality of circumferentially spaced radial anti-rotational elements is inclined relative to said bottom wall of said annular groove at an angle of between five and fifteen degrees.

8. The self-attaching fastener as defined in claim 1, wherein said outer wall of said annular groove is inclined inwardly from said bottom wall toward said pilot portion, said top face of each of said first plurality of circumferentially spaced anti-rotation elements is inclined upwardly from said bottom wall to said outer wall having an end surface adjacent said outer side wall spaced above a plane of said bottom wall and said top face of each of said second rilurality of circumferentially spaced radial anti-rotation elements is inclined downwardly toward said inner wall of said annular groove each having an end surface adjacent said inner wail spaced below said plane of said bottom wall of said annular groove.

9. The self-attaching fastener as defined in claim 8, wherein said top face of each of said first and second plurality of circumferentially spaced radial anti-rotation elements is inclined from a midportion of said bottom wall toward one of said inner and outer side wails of said annular groove.

10. The self-attaching fastener as defined in claim 8, wherein said planar top face of each of said first and second plurality of circumferentially radial anti-rotation elements is inclined relative to said bottom wall of said annular groove at an angle of between five and fifteen degrees.

11. A self-attaching fastener, comprising:
a central pilot portion;
an annular flange portion surrounding said pilot portion having a planar end face; and
an annular groove in said end face of said flange portion surrounding said pilot portion including a planar bottom wall, an inner side wall surrounding said pilot portion and an opposed outer side wall, one of said inner and outer side walls of said annular groove inclined toward the other of said inner and outer side walls to define a restricted opening of said annular groove adjacent said end face of said flange portion;
said planar bottom wail of said annular groove having a plurality of circumferentially spaced radial anti-rotation elements including a first plurality of circumferentially spaced radial anti-rotation elements each having a planar radially extending top face inclined radially upwardly from said bottom wall of said annular groove toward said one of said inner and outer side walls of said annular groove having an end surface spaced above said planar bottom wall and a second plurality of circumferentially spaced radial anti-rotation elements each having a planar radially extending top face inclined radially downwardly from said bottom wall toward the other of said one of said inner and outer side walls of said annular groove each having an end surface spaced below said bottom wall of said annular groove.

12. The self-attaching fastener as defined in claim 11, wherein said first and second plurality of circumferentially radial anti-rotation elements circumferentially alternate, such that one of said first plurality of circumferentially spaced radial anti-rotation elements is located between two of said second plurality of circumferentially spaced radial anti-rotation elements.

13. The self attaching fastener as defined in claim 11, wherein said planar top face of said first and second plurality of circumferentially spaced radial anti-rotation elements are inclined from a midportion of said bottom wall of said annular groove toward one of said inner and outer side walls of said annular groove.

14. The self-attaching fastener as defined in claim 13. wherein said inner wall of said annular groove is inclined from said bottom wall toward said outer wall and said outer wall of said annular groove is inclined toward said inner wall, said planar top face of said first plurality of circumferentially spaced radial anti-rotation elements being inclined upwardly from a midportion of said bottom wall to said outer wall of said annular groove and said planar top face of said second plurality of circumferentially spaced radial anti-rotation elements is inclined downwardly from a midportion of said bottom wall toward said inner side wall of said annalar groove.

15. The self-attaching fastener as defined in claim 13, wherein said second plurality of circumferentially spaced radial anti-rotation elements has a radial length greater than a radial length of said first pluraiity of circumferentially spaced radial anti-rotation elements.

16. The self-attaching fastener as defined in claim 11, wherein said planar top face of each of said first and second plurality of circumferentially spaced radial anti-rotation elements is inclined relative to said planar bottom wall at an angle of between five and fifteen degrees.

17. A female self-attaching fastener, comprising:
  a central pilot portion having an end face and a bore through said end face extending through said pilot portion;
  an annular flange portion surrounding said pilot portion having a planar end face; and
  an angular groove in said end face of said flange portion surrounding said pilot portion including a planar bottom wall, an inner side wall surrounding said pilot portion and an opposed outer side wall, one of said inner and outer side walls inclined toward the other of said inner and outer side walls to define a restricted opening of said annular groove at said end face of said flange portion;
  said bottom wall of said annular groove including a plurality of circumferentially spaced radial anti-rotation elements, including a first plurality of circumferentially spaced anti-rotation elements each having a radial top face inclined upwardly from said bottom wall of said annular groove to said outer wall having a radial end surface at said outer wall spaced above said bottom wall of said annular groove, and a second plurality of circumferentially spaced anti-rotation elements each having a radial top face inclined downwardly from said bottom wall of said annular groove toward said inner side wall of said annular groove having a radial end surface spaced below said bottom wall of said annular groove, with said first and second anti-rotational elements alternating circumferentially, such that one of said first plurality of circumferentially spaced anti-rotation elements is located between two of said second plurality of circumferentially spaced anti-rotation elements.

18. The female self-attaching fastener as defined in claim 17, wherein said top face of each of said first and second plurality of circumferentially spaced anti-rotation elements is inclined from a midportion of said bottom wall.

19. The female self-attaching fastener as defined in claim 18, wherein said top face of each of said second plurality of circumferentially spaced anti-rotation elements is longer than said top face of said first plurality of circumferentially spaced anti-rotation elements.

20. The female self-attaching fastener as defined in claim 17, wherein said top face of said first and second plurality of circumferentially spaced anti-rotation elements is inclined from said bottom wall of said annular groove at an angle of between five and fifteen degrees.

* * * * *

UNITED STATES PATENT AND TRADEMARK OFFICE
CERTIFICATE OF CORRECTION

PATENT NO. : 7,066,700 B2 Page 1 of 1
APPLICATION NO. : 10/758906
DATED : June 27, 2006
INVENTOR(S) : Richard P. Ward et al.

It is certified that error appears in the above-identified patent and that said Letters Patent is hereby corrected as shown below:

In column 9, line 31, please delete "arc" and insert --are--.

In column 9, line 66, please delete "rilurality" and insert --plurality--.

In column 10, line 2, please delete "wail" and insert --wall--.

In column 10, line 67, please delete "annular" and insert --annular--.

In column 11, line 4, please delete "pluraiity" and insert --plurality--

Signed and Sealed this

Seventeenth Day of October, 2006

JON W. DUDAS
*Director of the United States Patent and Trademark Office*